United States Patent
Miranda et al.

(10) Patent No.: US 9,360,001 B2
(45) Date of Patent: Jun. 7, 2016

(54) SUCTION VALVE FOR A REFRIGERATION COMPRESSOR AND ITS MOUNTING PROCESS

(75) Inventors: Roque Tadeu Miranda, Florianopolis-Sc (BR); Guilherme Alan Kruger, Joinville-Sc (BR)

(73) Assignee: Whirlpool S.A., São Paulo—Sp (BR)

( * ) Notice: Subject to any disclaimer, the term of this patent is extended or adjusted under 35 U.S.C. 154(b) by 408 days.

(21) Appl. No.: 13/988,058

(22) PCT Filed: Nov. 18, 2011

(86) PCT No.: PCT/BR2011/000432
§ 371 (c)(1),
(2), (4) Date: Jul. 12, 2013

(87) PCT Pub. No.: WO2012/065238
PCT Pub. Date: May 24, 2012

(65) Prior Publication Data
US 2013/0280113 A1 Oct. 24, 2013

(30) Foreign Application Priority Data

Nov. 19, 2010 (BR) .................................... 11004519
Oct. 11, 2011 (BR) .................................... 11104325

(51) Int. Cl.
*F16K 15/14* (2006.01)
*F04B 39/10* (2006.01)
*F16K 15/16* (2006.01)

(52) U.S. Cl.
CPC ............. *F04B 39/1073* (2013.01); *F16K 15/16* (2013.01); *Y10T 137/0497* (2015.04); *Y10T 137/7891* (2015.04)

(58) Field of Classification Search
CPC .... F04B 39/1073; F04B 39/108; F16K 15/16; Y10T 137/0497; Y10T 137/7891; Y10T 137/7879; Y10T 137/7894
See application file for complete search history.

(56) References Cited

U.S. PATENT DOCUMENTS

| | | | |
|---|---|---|---|
| 5,140,748 A | 8/1992 | Kandpal | |
| 5,209,260 A * | 5/1993 | Baek ................... | F04B 39/1073 137/527 |
| 5,456,287 A * | 10/1995 | Leu ..................... | F04B 39/1073 137/855 |

(Continued)

FOREIGN PATENT DOCUMENTS

WO 2007070995 A1 6/2007

OTHER PUBLICATIONS

International Search Report and Written Opinion, International Application No. PCT/BR2011/000432, International fileg date Nov. 18, 2011.

*Primary Examiner* — Jessica Cahill
(74) *Attorney, Agent, or Firm* — Dinsmore & Shohl LLP (57) ABSTRACT

The compressor comprises a valve plate, to be affixed to a compressor block, and a suction valve (V) formed by a spacer body, having a median opening and a flexible vane, which has a fixing end portion provided with a contour, symmetrical or asymmetrical, in relation to a longitudinal axis (X) of the flexible vane and which presents peripheral edge portions to be seated against respective inner edge portions of the median opening for restricting coplanar, linear and angular displacements of the flexible vane in relation to the spacer body upon seating the flexible vane against the valve plate, in the interior of the median opening.

15 Claims, 6 Drawing Sheets

(56) References Cited

U.S. PATENT DOCUMENTS

| | | | |
|---|---|---|---|
| 6,006,785 A * | 12/1999 | Iversen | F04B 39/1073 137/855 |
| 6,227,825 B1 | 5/2001 | Vay | |
| 6,293,774 B1 * | 9/2001 | Brabek | F04B 39/1073 137/855 |
| 6,461,126 B1 * | 10/2002 | Pierobon | F04B 39/1073 137/855 |
| 7,493,915 B2 * | 2/2009 | Lee | F01L 3/205 137/856 |
| 2008/0310980 A1 * | 12/2008 | Ramsdorf | F04B 39/1066 417/559 |

\* cited by examiner

FIG. 1

PRIOR ART

PRIOR ART

SUCTION VALVE FOR A REFRIGERATION COMPRESSOR AND ITS MOUNTING PROCESS

FIELD OF THE INVENTION

The present invention refers to a suction valve, which is not of the single-piece type that is, made of two pieces, to be mounted in a reciprocating piston refrigeration compressor, particularly a compressor used in small refrigeration systems. The invention also refers to a process for mounting said suction valve to the compressor.

BACKGROUND OF THE INVENTION

The energetic efficiency of the refrigeration compressors is mostly attributed to the good performance of their valves in the control of the gas flow.

In the reciprocating refrigeration compressors, the compression of the refrigerant gas is obtained by movement of the piston, which is driven by a driving means, such as a mechanism of the connecting rod-crankshaft type, or by a linear motor. The piston slides, in a reciprocating movement, in the interior of a compression chamber defined in the block of the compressor. At the moment in which the piston begins to return from the upper dead point to the lower dead point, in its suction stroke, it draws the refrigerant gas from the suction line of the refrigeration system to which the compressor is coupled (that is, it draws the refrigerant gas coming from the evaporator of the refrigeration system). Subsequently, when said piston returns from the lower dead point, in its compression stroke, it compresses the refrigerant gas which, under high pressure (of condensation), flows through the discharge system and returns to the refrigeration system to which the compressor is coupled.

Reciprocating refrigeration compressors use one way valves to control the gas flow during operation thereof. The valve systems provided in a valve plate, in the head region of the compressor, are responsible for regulating the flowrate and optimizing the dynamics of the gas flowing during the suction and the discharge of refrigerant gas in relation to the compression chamber.

A suction valve controls the gas flow coming from the suction line connected to the low pressure side of the refrigeration system and which is drawn into the interior of the compression chamber, whilst a discharge valve controls the already compressed gas flow to be directed to the high pressure side of the refrigeration system, said valves being designed to have their opening and closing pendular movement synchronized with the movement of the piston.

The suction and discharge valves are generally constituted of flexible vanes, which are fixed by one of the ends thereof and operatively associated with one or more passage orifices, so that, when the pressure differential is established through the valve, the flexible vane moves, by elastic deformation, away from the respective passage orifice, allowing the passage of the gas in the required preferential direction.

There are known countless embodiments of suction valves for reciprocating refrigeration compressors, regarding the project of the flexible vane (obturator element), of the valve seat, of the gas passage orifice and also the way the valve parts are attached.

Single-Piece Suction Valves

Figure 1:
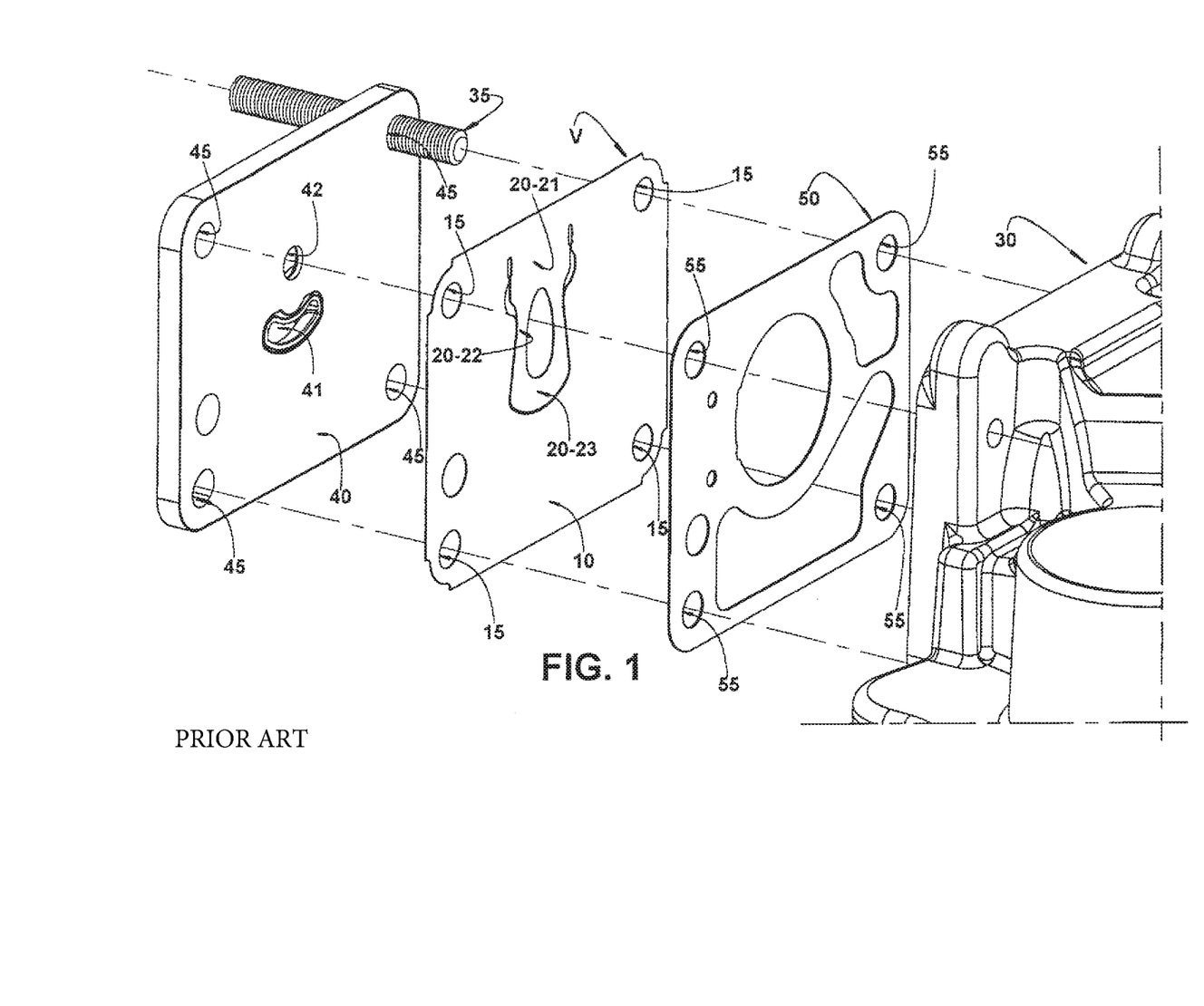
FIG. 1 represents a perspective view of a partially cut compressor block, and also illustrates, in an exploded manner, a sealing gasket, a valve plate and a single-piece suction valve of the prior art.

As illustrated in FIG. 1 of the enclosed drawings, the single-piece suction valves V, formed in a single piece, are generally obtained by stamping a high carbon or stainless steel sheet. This stamping operation allows the suction valve V to present, in a single piece, a flat spacer body 10 to be affixed between the crankcase 30 of the compressor and the valve plate 40, and a flexible vane 20, medianly disposed in relation to the spacer body 10 and having a fixing end portion 21 incorporated to the spacer body 10, and a bending median portion 22 and a sealing end portion 23, which are displaced in relation to the spacer body 10 during the opening of the suction valve V in relation to a respective passage orifice in the valve plate 40. As illustrated in FIG. 1, it is usually provided a sealing gasket 50 between the metal sheet of the suction valve V and the crankcase 30, said metal sheet generally presenting a contour corresponding to that of the valve plate 40.

After the step of stamping the metal sheet, the suction valve V is submitted to a tumbling operation, for rounding/finishing the edges of the flexible vane 20, so as to guarantee the latter to have a useful life compatible with that expected for the compressor.

In this type of construction, the spacer body 10 and the flexible vane 20 are formed with the same material, and the radial gap between the flexible vane 20 and the spacer body 10 becomes oversized in relation to the gap which is required for the angular displacement of the flexible vane 20, for allowing not only the use of an adequately resistant stamping tool, but also the tumbling operation for rounding the edges of said movable portions of the vane. The need of a radial gap between the flexible vane 20 and the spacer body 10 provokes an undesirable increase of the dead volume of the compressor, impairing its volumetric efficiency.

It is known that one of the alternatives for reducing the suction losses of the compressor is to reduce the stiffness of the flexible vanes, which can be obtained by reducing the metal sheet thickness, but maintaining the same geometry of the flexible vane 20. However, it is necessary that the flexible vanes 20 present high impact and bending strength, which can be obtained with the use of nobler materials, which must be applied not only to the flexible vane 20, but also to the spacer body 10, in a single-piece with the vane, undesirably increasing the cost of the single-piece suction valve V.

Vane-Type Suction Valves

In an alternative known prior art construction, as described and illustrated in Brazilian patent document PI0505734-5 (WO2007/070995), the single-piece suction valve is replaced by a valve comprising only the flexible vane to be secured to the valve plate. These vane-type suction valves allow a significant reduction of the production costs, making the peripheral finishing by tumbling easier and allowing the flexible vane, as a single piece, to be formed in nobler materials of higher cost.

Nevertheless, considering that the flexible vane must be mounted between the confronting face of the valve plate and the sealing gasket to be seated against the block of the compressor, a problem occurs in that the sealing gasket has to "absorb" the thickness of the flexible vane. It should be noted that, although being compressible in its thickness, the sealing gasket admits a degree of compression which is insufficient to absorb or compensate for the thickness of the flexible vane disposed between the compressor block and the confronting face of the valve plate.

In order to overcome the problem regarding the seating of the flexible vane against the confronting face of the valve plate, it is known to provide a recess in the compressor block or in the valve plate (see solution described in document WO2007/070995), with the object of avoiding the problem of its thickness being "absorbed" by the sealing gasket, and guaranteeing the desired degree of sealing for the compression chamber.

However, the process for manufacturing the recess in the compressor block or in the valve plate requires a precise tolerance control for the recess depth. If the depth of the recess is lower than the thickness of the flexible vane, and the sealing gasket is not capable to deform under compression, so as to absorb the "excess" of thickness of the flexible vane, the required sealing degree will not be reached, resulting in leaks in the compression chamber after mounting the parts of flexible vane, sealing gasket, valve plate and head to the compressor block. On the other hand, when the depth of the recess is higher than the thickness of the flexible vane and the sealing gasket is not capable of compensating for this difference, there will occur leak in the compression chamber after mounting the parts responsible for the closing thereof. Considering that the manufacturing thickness of the flexible vanes varies by about 0.005 mm, the processes for manufacturing the recess in the valve plate with this margin of tolerance tends to increase the cost of this solution.

As it occurs in the solution described in document WO2007/070995, the flexible vane can have its fixing end portion attached to the valve plate by means of pins, by welding or by being only correctly positioned before the final mounting of the head.

The recess, when located in the valve plate, can be obtained during the sintering process of the valve plate or it can be machined afterwards. Even when the recess is obtained during the sintering of the valve plate, it is desirable to provide a surface finishing operation for the annular region which defines the seat for the seating of the sealing end portion of the flexible vane, so as to avoid leaks upon closing the suction valve, as well as the existence of peaks on the surface, which situations can impair the reliability of the suction valve. This surface finishing operation requires some reference points to guarantee the annular seat is parallel to the remaining recess surface. Irregularities on the recess surface may impair the alignment between the fixing end portion of the flexible vane and the annular seat of the suction valve, which can generate leaks during operation of the compressor. Besides, the finishing operations of surfaces presenting recesses can substantially increase the production costs, as compared with operations for finishing smooth surfaces, and even annul the advantages related to the vane-type suction valves.

Two-Piece Suction Valves

Figure 2:
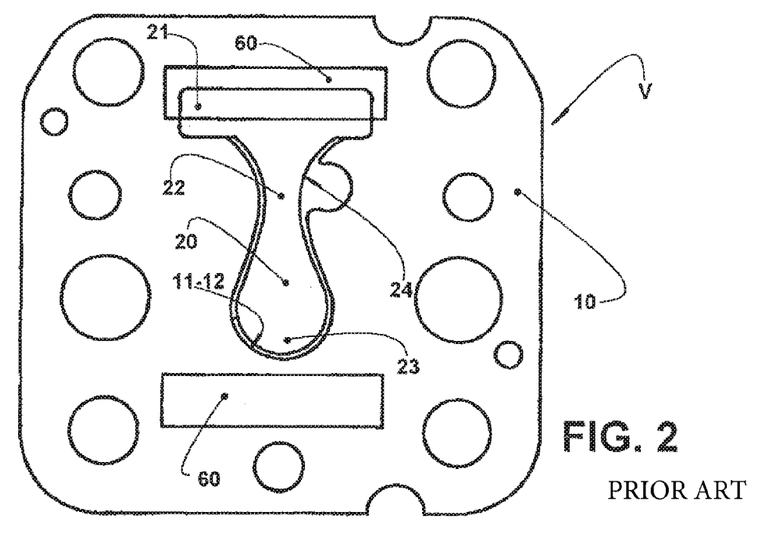
FIG. 2 represents a front view of a prior art suction valve, formed by two pieces previously affixed to each other, before being mounted to the valve plate.
Figure 3:
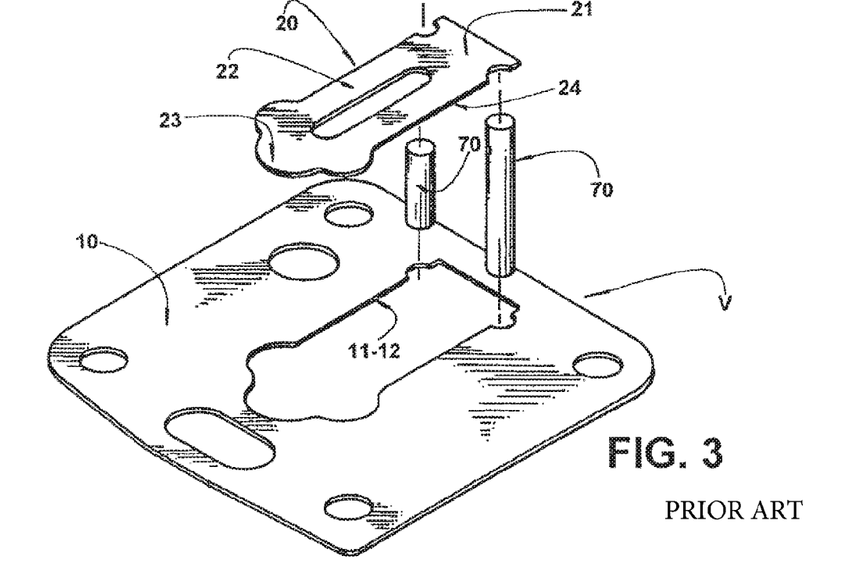
FIG. 3 represents an exploded perspective view of a prior art suction valve, formed by two different pieces, the flexible vane being attached to the spacer body and to the valve plate by means of pins.
Figure 4:
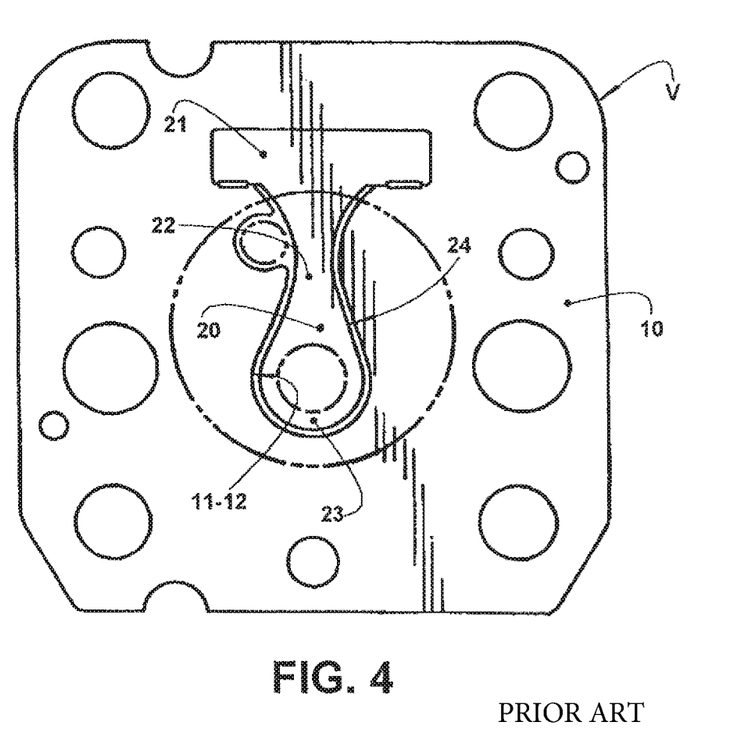
FIG. 4 represents a front view of a prior art suction valve, formed by two pieces that are previously affixed to each other, before being mounted to the valve plate.

FIGS. 2, 3 and 4 illustrate known constructions of two-piece suction valves comprising a spacer body 10, formed in a relatively low cost material, and a flexible vane 20, formed in a separate piece with a noble material, to comply with the operational requirements of the compressor.

This two-piece construction also allows stamping two different pieces and tumbling them separately, without excessively increasing the radial gap (dead volume) and allowing a better finishing for the edges of the two pieces.

Nevertheless, although not presenting the limitations of the single-piece suction valve construction, which has two component-parts formed in a single piece, this solution comprising two different pieces presents the disadvantage of requiring additional procedures and measures for joining the spacer body and flexible vane to each other, and then for mounting them to the valve plate, in order to guarantee the correct positioning of the flexible vane in the latter, before affixing the valve plate to the crankcase 30 (illustrated only in FIG. I).

The solution illustrated in FIG. 2 is described in Brazilian patent document PI9604645-7 and requires the use of a fixation element as, for example, an adhesive tape 60, to maintain the flexible vane 20 secured to the spacer body 10 in a predetermined position, before mounting the assembly formed by the two pieces of the valve, against the crankcase 30, with the interposition of the sealing gasket. This prior art solution requires the flexible vane 20 to be previously attached to the spacer body 10, before affixing the assembly to the compressor.

In case of using the adhesive tape 60 as a means for affixing the flexible vane 20 to the spacer body 10, this fixation element must present a reduced thickness and be inert to the working fluid of the compressor, so as not to deteriorate along the useful life of the latter, at the risk of obstructing the system, reducing the efficiency of the compressor or even stopping the operation thereof. In order to facilitate the stacking of the assembly formed by the flexible vane 20 and by the spacer body 10, a second adhesive tape can be used in a position diametrically opposite to the first one. Thus, these components previously affixed to each other require measures upon handling, shipping and storage, so that the flexible vane 20 does not detach from the spacer body 10. The solution illustrated in FIG. 3 is described in patent document U.S. Pat. No. 5,140,748 and also requires additional fixation elements for the two pieces of the valve, to attach the flexible vane 20 to the spacer body 10 and the assembly formed thereby to the valve plate 40. The fixation elements are defined by pins 70 which require, for their application, a drilling operation in both the valve plate and the compressor block. This solution has the inconvenience of presenting cost increments related to the production of pins and holes for the fitting in the compressor block and in the valve plate, as well as to the complexity of the manufacturing and mounting processes.

FIG. 4 refers to a construction described in patent document U.S. Pat. No. 6,227,825 and which also considers the previous fixation of the flexible vane 20 to the spacer body 10, before affixing the assembly formed by the two components of the valve to the compressor.

The fixation of the two pieces of the suction valve to each other is carried out by a fixation means, such as adhesive, welding, brazing, laser and the like, which need some care. If the joining of the two materials is made by means of an adhesive material, the measures taken for handling and shipping should be such as to avoid the flexible vane 20 and the spacer body 10 from separating from each other. The properties of the flexible vane cannot suffer physical or chemical alterations, after the joining process, at the risk of compromising its useful life. Since the materials generally have different mechanical properties and different chemical compositions, it is necessary to choose a joining process, by means of welding, brazing, etc., which preserves the characteristics of the material, especially the material of the vane. Also during the joining process, it cannot occur excessive deposition of material which surpasses the nominal thickness of the metal sheets which define the two valve pieces, which can cause leaks in the compression chamber, with harmful impact on the efficiency of the compressor.

The butt joint, between the fixing end portion of the vane and the spacer body, is a process which requires additional measures, mainly due to the reduced thickness of the metal sheets from which the flexible vane and the spacer body are manufactured.

In short, the process for affixing the vane and the spacer body to each other requires several cares, and may compromise the reduction of cost obtained by using a less noble material in the spacer body.

OBJECTS OF THE INVENTION

Thus, it is an object of the present invention to provide a suction valve, of the type which comprises two different pieces defined by a flexible vane and by a spacer body, and to be adapted to the valve plate of a refrigeration compressor, by means of a relatively simple and inexpensive mounting process, making unnecessary the use of additional fixation means to secure the two pieces together, before being mounted to the valve plate.

The present invention has also the object of providing a mounting process for the suction valve, as mentioned above, which is able to simplify and reduce the operational costs for manufacturing the valve plate and for mounting the flexible vane and the spacer body, as well as to guarantee a correct positioning of the flexible vane on the valve plate, before mounting the latter to the compressor.

SUMMARY OF THE INVENTION

The present suction valve is applied to a refrigeration compressor of the type which comprises a compressor block affixing a valve plate which is provided with at least one suction orifice. The suction valve presents only one nominal thickness and is formed by a spacer body, to be seated on the valve plate and provided with a median opening having a continuous inner edge, and by a flexible vane, having a peripheral edge with a contour which corresponds to that of the inner edge of the median opening.

The flexible vane is formed, along a longitudinal axis, by a fixing end portion, to be seated and secured to the valve plate, in the interior of the median opening of the spacer body, a bending median portion, and a sealing end portion which is operatively associated with the suction orifice of the valve plate.

According to the invention, the fixing end portion of the suction valve is provided with peripheral edge portions, to be seated against respective inner edge portions of the median opening, in order to restrict coplanar movements of the fixing end portion in relation to the spacer body, limiting linear and angular displacements, in any direction or sense, of the flexible vane in relation to the spacer body and in the plane of the latter, upon seating the flexible vane against the valve plate, in the interior of said median opening.

In cases in which a gap is provided between the peripheral edge portions of the fixing end portion and the respective inner edge portions of the median opening of the spacer body, said gap should be smaller than a respective gap defined, in the same direction and sense of restriction of the coplanar displacement of the flexible vane in relation to the spacer body, between the peripheral edge portions of the bending median portion and of the sealing end portion of the flexible vane and the confronting portions of the continuous internal edge of the median opening, in order to limit the movements of the vane in the interior of the median opening of the spacer body, to values sufficiently small to avoid the contact of the bending median portion and of the sealing end portion of the vane with the spacer body, during the operation of the compressor.

In a possible constructive embodiment of the invention, the peripheral edge portions of the fixing end portion of the vane are seated against the respective inner edge portions of the median opening of the spacer body, according to directions that are respectively orthogonal and parallel to the longitudinal axis, upon seating of the flexible vane against the valve plate, in the interior of the median opening.

In a preferred way of carrying out the present invention, the fixing end portion of the suction valve presents a contour asymmetrical in relation to the longitudinal axis of the flexible vane, to impede the flexible vane from being seated, in an inverted position, against the valve plate.

The construction proposed by the invention permits obtaining all the advantages regarding reduction of the material cost and simplification of the process for manufacturing the flexible vane and the spacer body in two different pieces, but without the inconveniences and difficulties of the known constructions related to the mandatory use of additional fixation means to guarantee the fixation of the flexible vane to the spacer body, before mounting said pieces to the valve plate, as well as to maintain said pieces adequately seated against the valve plate, before securing the latter to the compressor block.

Further according to the invention, after the manufacture of the two pieces, the spacer body is seated against the valve plate and maintained thereon in a predetermined mounting position, to allow the flexible vane to be then seated against the valve plate, in the interior of the median opening of the spacer body, with at least part of the peripheral edge of the fixing end portion of the vane being seated against a respective extension of the inner edge of the median opening of the spacer body.

The maintenance of the flexible vane seated against the valve plate, before mounting the latter to the compressor block, can be ensured by seating the peripheral edge of the fixing end portion against the confronting inner edge of the median opening of the spacer body, with or without the aid of an amount of adhesive, or of oil or other viscous liquid, applied to at least one of the confronting faces of the vane and of the valve plate, as described in Brazilian patent document PI0505734-5 (WO2007/070995).

BRIEF DESCRIPTION OF THE DRAWINGS

The invention will be described below, with reference to the enclosed drawings, given by way of example of some embodiments of the invention and in which.

DESCRIPTION OF THE INVENTION

As already mentioned, the present invention refers to a suction valve V of the type which comprises a spacer body 10, stamped from a flat metal sheet or otherwise formed in any adequate material such as, for example, in plastic material, and a flexible vane 20, stamped in a separate piece, from a metal sheet whose characteristics are adequate to the application and made of a generally nobler material than that used to form the spacer body 10. The spacer body 10 and the flexible vane 20 are formed of sheets presenting the same nominal thickness. The suction valve is applied to a refrigeration compressor of the type which comprises, in the interior of a casing (not illustrated), a crankcase 30 in whose interior is conventionally defined a compression chamber (not illustrated), which has an end closed by a valve plate 40 provided with at least one suction orifice 41 and at least one discharge orifice 42, as represented in FIG. 1.

Between the valve plate 40 and the crankcase 30 it is mounted a sealing gasket 50 of a well known prior art construction. The fixation of the valve plate 40 and the sealing gasket 50 in the crankcase 30 is conventionally obtained by a cylinder cover (not illustrated), which compresses the valve plate 40 and the sealing gasket 50 against the crankcase 30 through fixation means which may present different constructions. In the exemplary construction considered herein, said fixation is obtained by means of fixation screws 35 disposed through holes 45, (see construction of FIG. 1) provided in the valve plate 40 and in the sealing gasket 50, said screws being threaded in the compressor block, in a well known prior art arrangement.

The suction valve V has its spacer body 10 configured to be seated against a confronting face of the valve plate 40 and generally presents, but not mandatorily, the same contour of the latter and also holes 15, to be aligned with the holes 45 of the valve plate and with the holes of the sealing gasket 50, for the passage of the already mentioned fixation screws 35, in order to attach the components of the head to the crankcase 30.

As illustrated in FIGS. 5 to 7A, the spacer body 10 is provided with a median opening 11, defined by a continuous inner edge 12 and which is positioned aligned with the suction orifice 41 of the valve plate 40. The spacer body 10 has its median opening 11 configured to also allow the fluid communication between the discharge orifice 42 of the valve plate 40 and the interior of the compression chamber of the compressor block 10, through the sealing gasket 50 (see FIG. 1).

The flexible vane 20 of the suction valve V presents a peripheral edge 24 with a contour corresponding to the contour of the inner edge 12 of the median opening 11 of the spacer body 10, so as to be fitted in said median opening 11 of the spacer body 10, after the latter is seated against the valve plate, as illustrated in FIGS. 5 to 7A.

The flexible vane 20 is formed, along its longitudinal axis X, by a fixing end portion 21, to be seated and secured to the valve plate 40, in the interior of the median opening 11, by a bending median portion 22 and by a sealing end portion 23, the latter being operatively associated with the suction orifice 41, so as to open and close the latter during the compressor operation.

According to the invention, the fixing end portion 21 is provided with a contour preferably asymmetrical in relation to the longitudinal axis X, and also with peripheral edge portions 24a, 24b, 24c and 24d, which are seated against respective inner edge portions 12a, 12b, 12c and 12d of the median opening 11, in order to restrict coplanar movements of the fixing end portion in relation to the spacer body 10, limiting linear and angular displacements, in any direction and sense, of the flexible vane 20 in relation to spacer body 10 and in the plane of the latter, upon the seating the flexible vane 20 against the valve plate 40, in the interior of said median opening 11.

In the illustrated constructive embodiment the peripheral edge portions 24a, 24b, 24c and 24d of the fixing end portion 21 of the flexible vane 20 are seated against the respective inner edge portions 12a, 12b, 12c and 12d of the median opening 11, according to directions respectively parallel and orthogonal to the longitudinal axis X, upon seating the flexible vane 20 against the valve plate 40, in the interior of the median opening 11. As illustrated in FIGS. 5 to 7A, the fixing end portion 21 has its contour dimensioned to allow said portion to be tightly fitted, but without interference, in the interior of the median opening 11 of the spacer body 10, so that the confronting portions of the peripheral edge 24 and of the inner edge 12 may be seated against each other, restricting coplanar movements of the fixing end portion 21 in relation to the spacer body 10 and in the plane of the latter, upon the seating the flexible vane 20 against the valve plate 40, in the interior of said median opening 11.

Thus, the dimensioning of the contours of both the median opening 11 and the flexible vane 20 is made so as to result in a gap, between said contours, sufficient to comply with the requirements of the manufacturing process of said parts, that is, in a gap which is minimum or even null between the peripheral edge portions 24a, 24b, 24c and 24d of the fixing end portion 21 and the confronting inner edge portions 12a, 12b, 12c and 12d of the spacer body 10.

In cases in which there is a gap between the peripheral edge portions 24a, 24b, 24c and 24d of the fixing end portion 21 and the respective inner edge portions 12a, 12b, 12c and 12d of the median opening 11 of the spacer body 10, said gap will be smaller than a respective gap defined, in the same direction and sense of restriction of the displacement of the vane 20 in relation to the spacer body 10, between the peripheral edge 24 of the bending median portion 22 and of the sealing end portion 23 of the vane 20 and the confronting portions of the continuous inner edge 12 of the median opening 11, in order to limit the movements of the vane 29, in the interior of the median opening 11 of the spacer body 10, to values sufficiently small to avoid the contact of the bending median portion 22 and of the sealing end portion 23 of the vane 20 with the spacer body 10, during the bending angular displacement of the vane 20, during the operation of the compressor.

Thus, it is possible to guarantee bending angular movement of the bending median portion 22 and of the sealing end portion 23 of the vane 20 in relation to the spacer body 10 and in a plane orthogonal to the plane of the spacer body, without contacting the latter and reducing to a minimum the dead volume defined by this gap.

The asymmetry of the contour of the fixing end portion 21, in relation to the longitudinal axis X, allows preventing the flexible vane 20 from being mounted in an inverted position, that is, rotated by 180 degrees around said longitudinal axis X. However, it should be understood that the contour of the fixing end portion 21 can be symmetrical in relation to said longitudinal axis X, situation in which the inverted mounting of the flexible vane 20 must be impeded, if necessary, by other measures which do not depend on said contour asymmetry.

The asymmetry of the contour of the fixing end portion 21 can be obtained by means of different shapes applied to the contour of the fixing end portion 21 of the flexible vane 20.

Figure 5:
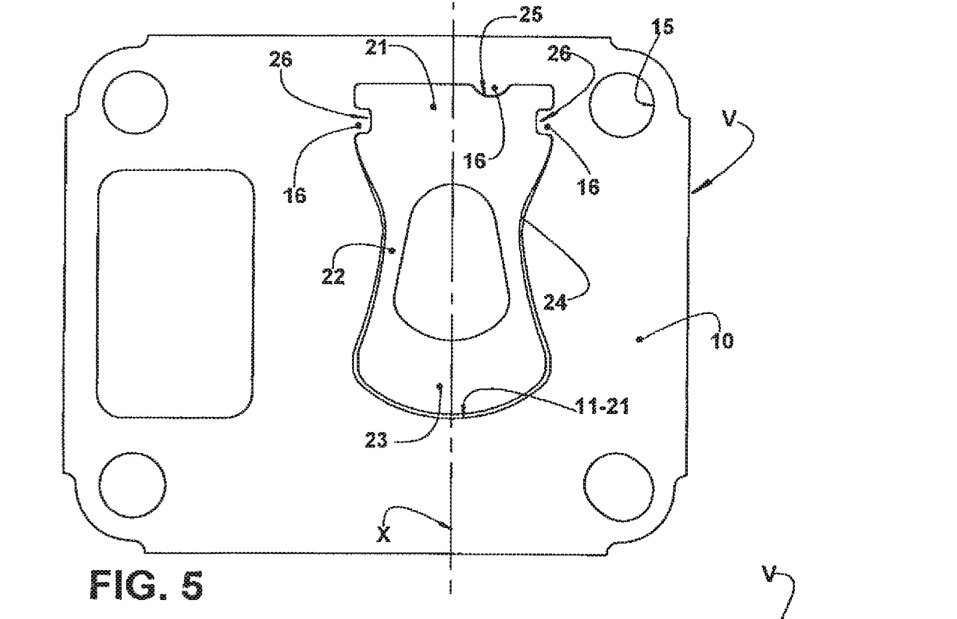
FIGS. 5 and 5A represent, respectively, a front view and an enlarged detail partially cut out from a suction valve constructed according to a first embodiment of the present invention and comprising a flexible vane positioned in the interior of the median opening of a spacer body.
Figure 5A:
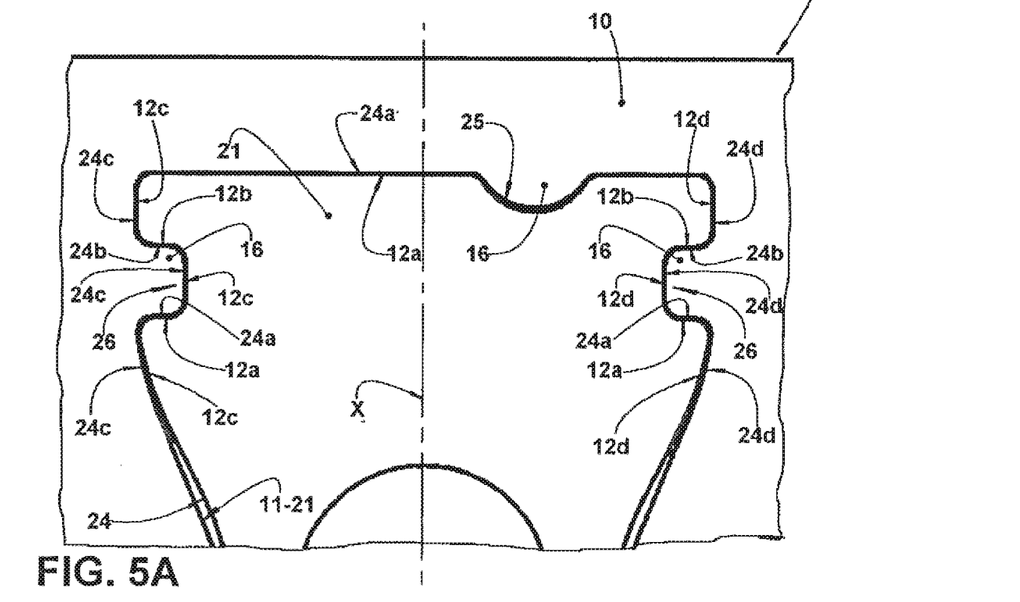

In the construction illustrated in FIGS. 5 and 5A, the asymmetry of the contour of the fixing end portion 21 and, consequently, of the corresponding inner edge portion 12 of the median opening 11 of the spacer body 10, is defined by an end cutout 25 which, in the illustrated embodiment, is provided in the peripheral edge portion 24a of the fixing end portion 21, disposed in such a way as to be intercepted by the longitudinal axis X and in an eccentric position in relation to said axis X.

Figure 7:
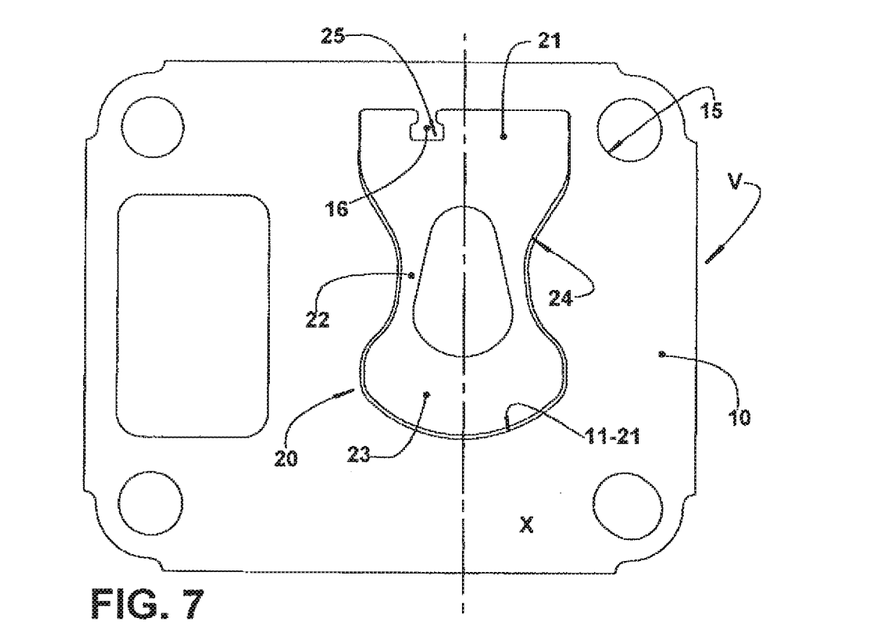
FIGS. 7 and 7A represent views which are similar to those of FIGS. 6 and 6A, respectively, illustrating a third embodiment of the suction valve of the present invention.
Figure 7A:
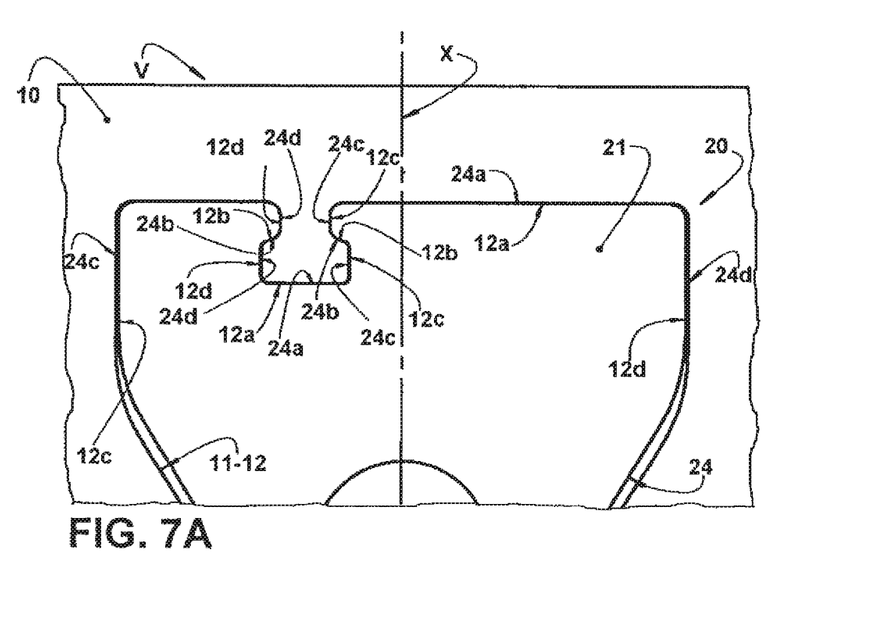

In the illustrated form, given as an example, said peripheral edge portion 24a is disposed orthogonally to the longitudinal axis X. The provision of a single end cutout 25 is illustrated in FIGS. 7 and 7A.

It should be understood that, in case the inverted mounting of the flexible vane 20 is not absolutely necessary, the end cutout 25 can be provided in a position concentric in relation to the longitudinal axis X, so as to provide, to the respective part which carries it, a contour symmetrical in relation to the longitudinal axis X.

It should be further understood that the end cutout 25 can be also used together with a pair of lateral cutouts 26, as illustrated in FIGS. 5, 5A, 6 and 6A. Each lateral cutout 26 is provided in each peripheral edge portion 24 (of the fixing end portion 21) not intercepted by the longitudinal axis X of the flexible vane 20. Each lateral cutout 26 is positioned to have one or both the parameters, defined by the axial distance of its median axis in relation to the peripheral edge portion 24a (intercepted by the longitudinal axis X), and by the contour of said lateral cutout 26, equal or different in relation to the respective parameters related to the other of said lateral cutouts 26.

Thus, the contours of the lateral cutouts can be equal to each other and equally distanced in relation to said peripheral edge 24a which intercepts the longitudinal axis X, or also different from one another and equally or differently spaced from said peripheral edge 24a of the fixing end portion 21.

When the parameters are equal, the contour of the fixing end portion 21 will be symmetrical in relation to the longitudinal axis X, providing no impediment to the inverted mounting of the flexible vane 20. In this case, if it is necessary to take said measure in the mounting, it can be provided an end cutout 25 which is eccentric in relation to the longitudinal axis X.

When at least one of the parameters is different, the contour of the fixing end portion 21 will be asymmetrical in relation to the longitudinal axis X, thus providing an impediment to the inverted mounting of the flexible vane 20, independently of the provision of an end cutout 25 eccentric in relation to the longitudinal axis X, which end cutout 25 can be thus replaced by lateral cutouts 26 which are capable of imparting an asymmetrical contour to the fixing end portion 21.

The same comments mentioned above, related to the number, contour and positioning of the end cutout 25 and of the lateral cutouts 26 provided in the fixing end portion 21, are likewise applicable to a constructive form (not illustrated), in which said cutouts are provided in the spacer body 10, from the inner edge 12 of its median opening 11.

In the construction illustrated in FIGS. 5 and 5A, each lateral cutout 26 defines a peripheral edge portion 24a, which is disposed according to a direction which intercepts the longitudinal axis X and which is seated, together with the peripheral edge portion 24a (intercepted by said longitudinal axis X), against a confronting inner edge portion 12 of the median opening 11, to restrict or even to impede linear displacements of the flexible vane 20 in the same direction of the longitudinal axis X and toward the fixing end portion 21 of the flexible vane 20. Each lateral cutout 26 also defines a peripheral edge portion 24b, also disposed according to a direction which intercepts the longitudinal axis X and which operates, against the confronting inner edge portion 12 of the median opening 11, to restrict or even to impede linear displacements of the flexible vane 20 in the same direction of the longitudinal axis X and toward the sealing end portion 23 of the flexible vane 20. Each lateral cutout 26 also presents a respective peripheral edge portion 24c, 24d, generally parallel to said longitudinal axis X and which operates, together with the other peripheral edge portions 24c, 24d of the fixing end portion 21, external to the lateral cutouts 26, and against the confronting inner edge portions 12 of the median opening 11, to restrict or even to impede the linear displacement of the flexible vane 20, in a direction generally transversal, orthogonal or inclined to the longitudinal axis X, in both senses.

The inner edge portions 12 of the median opening 11, which cooperate with the confronting peripheral edge portions 24 of the flexible vane 20, defined in the end cutout 25 and in each lateral cutout 26, are formed around a respective projecting portion 16 of the inner contour of the median opening 11, which is fitted in the interior of the corresponding cutout in the flexible vane.

The provision of the lateral cutouts 26 provides a more reliable retention of the flexible vane 20 in the interior of the median opening 11 of the spacer body 10, preventing the flexible vane 20 from moving, in a linear or angular movement, in any sense, on its seating plane against the confronting face of the valve plate 40.

The construction illustrated in FIGS. 5 and 5A has the option of suppressing the end cutout 25, in which case the contour of the fixing end portion 21 becomes symmetrical in relation to the longitudinal axis X, and no longer presents an indexing means with the function of impeding the inverted mounting of the flexible vane 20 against the valve plate 40.

Figure 6:
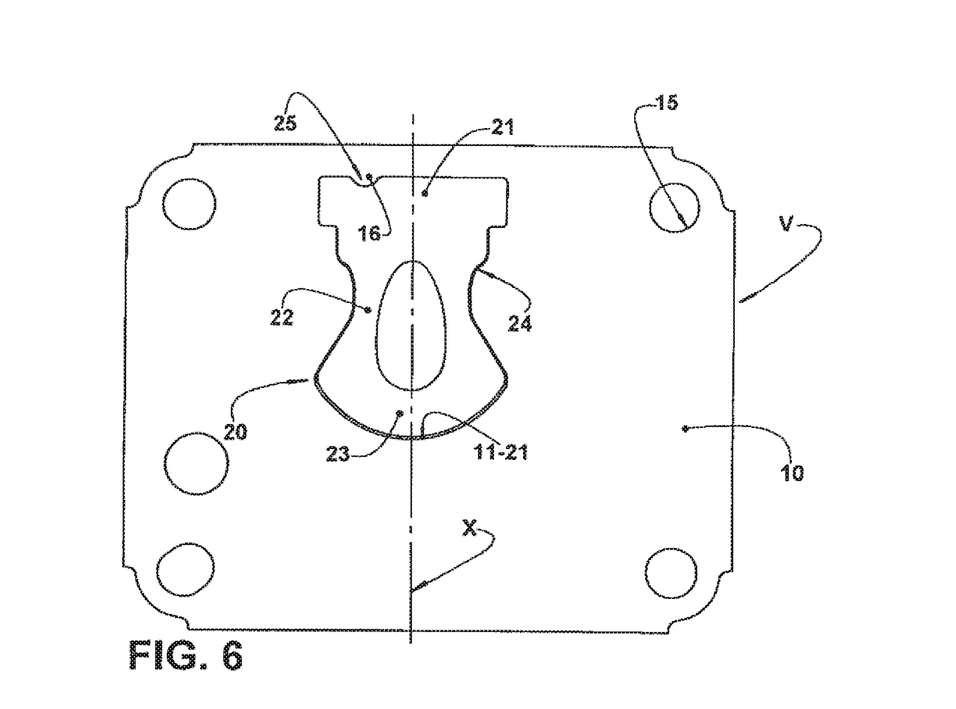
FIGS. 6 and 6A represent views similar to those of FIGS. 5 and 5A, respectively, but illustrating a suction valve constructed according to a second embodiment of the present invention.
Figure 6A:
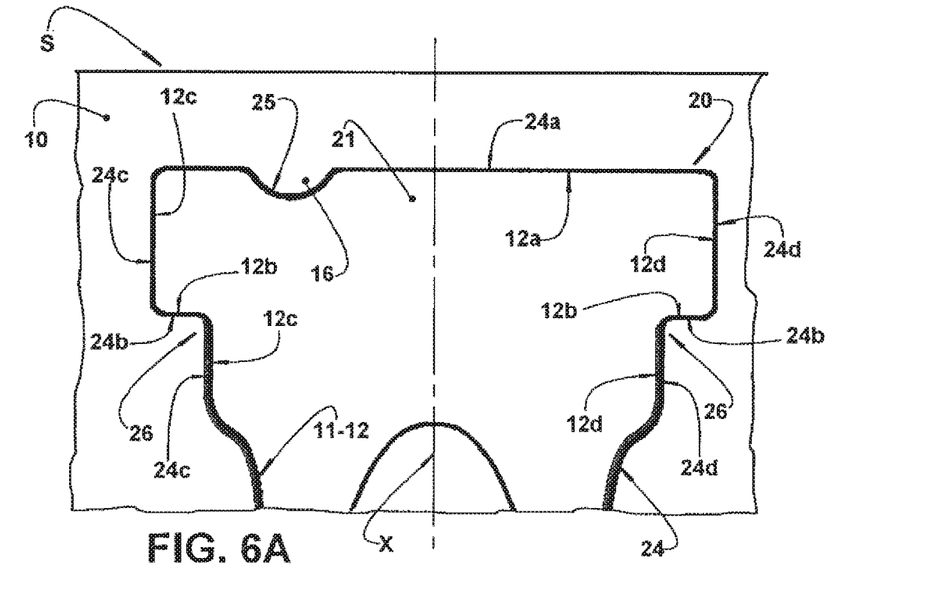

In the embodiment of FIGS. 6 and 6A, the lateral cutouts 26 are symmetrical in relation to the peripheral edge portion 24a intercepted by the longitudinal axis X, and present the same contour defined only by one peripheral edge portion 24b, to restrict or even to impede the flexible vane 20 from longitudinally displacing in the direction of the sealing end portion 23, and by a respective peripheral edge portion 24c and 24d, to restrict or even to impede the linear displacements of the flexible vane 20 in a transversal direction in relation to the longitudinal axis X.

In the embodiment of FIGS. 7 and 7A, the lateral cutouts 26 are suppressed, it being provided only one end cutout 25, which is eccentric in relation to the longitudinal axis X and configured to present, internally, peripheral edge portions 24a, 24b, 24c, 24d, corresponding to the same peripheral edge portions obtained with the two lateral cutouts 26 of the embodiment illustrated in FIGS. 5 and 5A, which are seated against respective inner edge portions 12a, 12b, 12c, 12d, provided in a projecting portion 16 of the inner contour of the median opening 11 of the spacer body 10.

It should be understood that the different constructive embodiments of the invention, as disclosed herein, can be presented in particular constructions or even totally or partially combined to each other, when not mutually excluding by their own functions.

Considering the compressor construction previously cited and partially illustrated in FIG. 1 of the drawings, the new suction valve construction proposed by the present invention, described above and illustrated in FIGS. 5 to 7A, allows that the process for mounting the suction valve comprises the initial operations of stamping and tumbling for shaping the spacer body 10, upon its formation in metal sheet, with its median opening 11 and with the holes 15 for the passage of the fixation screws 35 to the crankcase 30. Also, in a separate way, the process comprises operations of stamping and tumbling the flexible vane 20 with a contour preferably asymmetrical in relation to its longitudinal axis X and dimensioned so that the peripheral edge portions 24 of its fixing end portion 21 present a nominal gap sufficient to comply with the requirements of the manufacturing process, as already disclosed herein before, but without defining an interference fit, in relation to the contour of the confronting inner edge portions 12 of the median opening 11 of the spacer body 10, and so that the peripheral edge portions 24, of its bending median portion 22 and of its sealing end portion 23, present a minimum gap in relation to the contour of the confronting inner edge portions 12 of the median opening 11, to allow the free bending angular displacement of the bending median portion 22 and of the sealing end portion 23 in relation to the spacer body 10 and in a plane orthogonal to the mounting plane of the latter.

The stamping of the flexible vane is conducted in order that portions of the peripheral edge 24 of its fixing end portion 21 be configured to be seated against confronting portions of the inner edge 12 of the median opening 11 of the spacer body 10, for restricting coplanar movements of the fixing end portion 21 in relation to the spacer body 10, limiting linear and angular displacements of the flexible vane 20 in any direction or sense, in relation to the spacer body 10 and in the plane of the latter.

Preferably, the stamping of the flexible vane 20 and the shaping of the spacer body 10 are conducted to produce, in the fixing end portion 21 of the vane 20, peripheral edge portions 24a, 24b, 24c, 24d and, in the median opening 11 of the spacer body 10, inner edge portions 12a, 12b, 12c, 12d. The peripheral edge portions 24a, 24b, 24c, 24d are configured for defining, with the confronting inner edge portions 12a, 12b, 12c, 12d, a gap which is smaller than a respective gap defined, in the same direction and sense of the restriction of the coplanar displacement of the flexible vane 20 in relation to the spacer body 10, between the portions of the peripheral edge 24 of the bending median portion 22 and of the sealing end portion 23 of the vane 20 and the confronting portions of the continuous inner edge 12 of the median opening 11.

The asymmetry of the contour of the fixing end portion 21 of the flexible vane 20, and of the contour of the corresponding extension of the median opening 11 of the spacer body 10 is obtained, by the shaping operations of said components of the suction valve V, considering the geometries previously described in FIGS. 5 to 7A.

Then, the spacer body 10 is seated and maintained seated, in a predetermined position, against a confronting face of the valve plate 40, with the holes 45 of the latter being aligned with the holes 15 of the spacer body 10.

After seating the spacer body 10 against the valve plate 40, the flexible vane 20 is seated and maintained, in a predetermined position, against the latter, in the interior of the median opening 11 of the spacer body 10.

The sealing gasket 50 is then seated and maintained seated, in a predetermined position, on the spacer body 10 and on the flexible vane 20 which are already seated and maintained against the valve plate 40, already incorporating the fixation screws 35, so that the assembly formed by the cylinder cover (not illustrated) which carries the fixation screws 35, by the valve plate 40, by the suction valve V and by the sealing gasket 50 can be seated and affixed, by the fixation screws 35, against the crankcase 30.

The maintenance of the spacer body 10 seated against the valve plate 40 can be obtained by fitting the holes 15 of the spacer body 10, in the fixation screws 35 already mounted through the holes 45 of the valve plate 40, when the latter is already seated against the cylinder cover, or also by means of an amount of oil or other viscous liquid, or an adhesive applied on at least one of the confronting faces of the valve plate 40 and of the spacer body 10, when the seating of the suction valve V on the valve plate 40 is made before mounting the cylinder cover and the fixation screws 35.

The retention of the flexible vane 20 against the valve plate 40, in the interior of the median opening 11 of the spacer body 10, is obtained by previously applying a small amount of viscous liquid, for example, a drop of oil, preferably lubricating oil of the compressor, to one of the confronting faces of the valve plate 40 and of the flexible vane 20.

While only some embodiments for the present suction valve have been illustrated in the appended drawings, it should be understood that the form of the components can be altered without departing from the inventive concept defined in the claims that accompany the present specification.

The invention claimed is:

1. A refrigeration compressor of the type which comprises:
a compressor block;
a valve plate attached to the compressor block and provided with at least one suction orifice; and
a suction valve (V) formed, with the same nominal thickness as the valve plate, by a spacer body, provided with a median opening having a continuous inner edge and to be seated on the valve plate, and by a flexible vane, having a peripheral edge with a contour corresponding to the inner edge of the median opening and said flexible vane being formed, along a longitudinal axis (X), by a fixing end portion, to be seated and secured to the valve plate, in the interior of the median opening, a bending median portion and a sealing end portion, operatively associated with the suction orifice, wherein one of the fixing end portion comprises a peripheral edge portions and the median opening comprises an inner edge portions, and wherein the peripheral edge portions are seated against the inner edge portions without a gap between the peripheral edge portions and the inner edge portions and restrict coplanar displacement of the fixing end portion in relation to the spacer body and limit linear and angular displacements, in any direction, of the flexible vane in relation to the spacer body and in the plane of the latter, by the flexible vane being seated against the valve plate, in the interior of said median opening.

2. The suction valve, as set forth in claim 1, characterized in that the peripheral edge portions of the fixing end portion of the flexible vane define, with the confronting inner edge portions of the median opening, of the spacer body, a gap which is smaller than a respective gap defined, in the same direction of a restriction of the coplanar displacement of the flexible vane in relation to the spacer body, between the portions of the peripheral edge of the bending median portion and of the sealing end portion of the flexible vane and the confronting portions of the continuous inner edge of the median opening.

3. The refrigeration compressor, as set forth in claim 2, characterized in that the peripheral edge portions be seated against the respective inner edge portions of the median opening, according to directions respectively orthogonal and parallel to the longitudinal axis (X), upon seating the flexible vane against the valve plate, in the interior of the median opening.

4. The refrigeration compressor, as set forth in claim 1, characterized in that the fixing end portion presents a contour asymmetrical in relation to the longitudinal axis (X).

5. The refrigeration compressor, as set forth in claim 4, characterized in that one of the parts of fixing end portion and of median opening of the spacer body includes an end cutout provided in a peripheral edge portion, of the respective part, which intercepts the longitudinal axis (X), said end cutout being provided in an eccentric position in relation to the longitudinal axis (X), so as to provide, to the respective part, a contour asymmetrical in relation to the longitudinal axis (X).

6. The refrigeration compressor, as set forth in claim 5, characterized in that the end cutout presents, internally, peripheral edge portions of the respective part, seated against confronting inner edge portions defined in a projecting portion of the confronting contour of the other of said parts, so as to limit displacements of the flexible vane in its seating plane on the valve plate.

7. The refrigeration compressor, as set forth in claim 5, characterized in that one of the parts of the fixing end portion and of the median opening of the spacer body includes a pair of lateral cutouts, each presenting, internally, peripheral edge portions seated against confronting inner edge portions defined in a projecting portion of the confronting contour of the other of said parts, so as to impede the flexible vane from displacing in its seating plane on the valve plate.

8. The refrigeration compressor, as set forth in claim 7, characterized in that each of the lateral cutouts has a length defined by the axial distance of its median axis, in relation to the peripheral edge portion of said parts, the median axis intercepting the longitudinal axis (X), and wherein a contour of each of the lateral cutouts and the length of each of said lateral cutouts is equal to the other.

9. The refrigeration compressor valve, as set forth in claim 7, characterized in that each of the lateral cutouts presents has a length defined by the axial distance of its median axis, in relation to the peripheral edge portion of said parts, the median axis intercepting the longitudinal axis (X), and wherein a contour and the length of each of said lateral cutouts is different from each other.

10. A process for mounting a suction valve in a refrigeration compressor of the type which comprises: a compressor block; a valve plate attached to the compressor block and provided with at least one suction orifice; and a suction valve (V) formed, with the same nominal thickness as the valve plate, by a spacer body, provided with a median opening having a continuous inner edge and to be seated on the valve plate, and by a flexible vane, having a peripheral edge with a contour corresponding to the inner edge of the median opening, said flexible vane being formed, along a longitudinal axis (X), by a fixing end portion, to be seated and secured to the valve plate, in the interior of the median opening, a bending median portion and a sealing end portion, operatively associated with the suction orifice, the process being characterized in that it comprises the steps of:

stamping the flexible vane having the portions of the edge of its fixing end portion comprising peripheral edge portions shaping the spacer body, wherein the median opening comprises inner edge portions;

wherein the peripheral edge portions are configured to be seated against confronting portions of the inner edge portions of the median opening of the spacer body, wherein the peripheral edge portions are seated against the inner edge portions without a gap between the peripheral edge portions and the inner edge portions, so as to restrict coplanar displacements of the fixing end portion in relation to the spacer body, limiting linear and angular displacements, in any directions, of the flexible vane in relation to the spacer body and in the plane of the latter;

seating and maintaining the spacer body seated against a confronting face of the valve plate in a predetermined position;

seating and maintaining seated the flexible vane against the confronting face of the valve plate, in the interior of the median opening, in the spacer body; and affixing the valve plate, already carrying the suction valve (V), against the compressor block.

11. The process as set forth in claim 10, characterized in that the flexible vane is maintained seated against the valve plate, before attaching the latter to the compressor block, by previously applying an amount of viscous liquid on at least one of the confronting faces of the valve plate and of the flexible vane.

12. The process as set forth in claim 10, characterized in that the flexible vane is maintained seated against the valve plate, before attaching the latter to the compressor block, by seating the peripheral edge of the fixing end portion against the confronting inner edge of the median opening of the spacer body.

13. The process as set forth in claim 10, characterized in that the spacer body is maintained seated, in said predetermined position, against the valve plate, before attaching the latter to the compressor block, by previously applying an amount of viscous liquid on at least one of the confronting faces of the valve plate and of the spacer body.

14. The process as set forth in claim 10, the valve plate being attached to the compressor block by fixation screws disposed through respective holes provided in said valve plate and in the spacer body, characterized in that the spacer body is maintained seated, in said predetermined position, against the valve plate, before attaching the latter to the compressor block, by fitting the holes of the spacer body in the fixation screws already mounted through the holes of the valve plate.

15. The process as set forth in claim 14, characterized in that the contour of the fixing end portion of the flexible vane is asymmetrical in relation to the longitudinal axis (X).

* * * * *